Feb. 15, 1966    G. B. JOHNSON    3,234,828
CUT-OFF TOOL AND HOLDER ASSEMBLY
Original Filed July 30, 1963
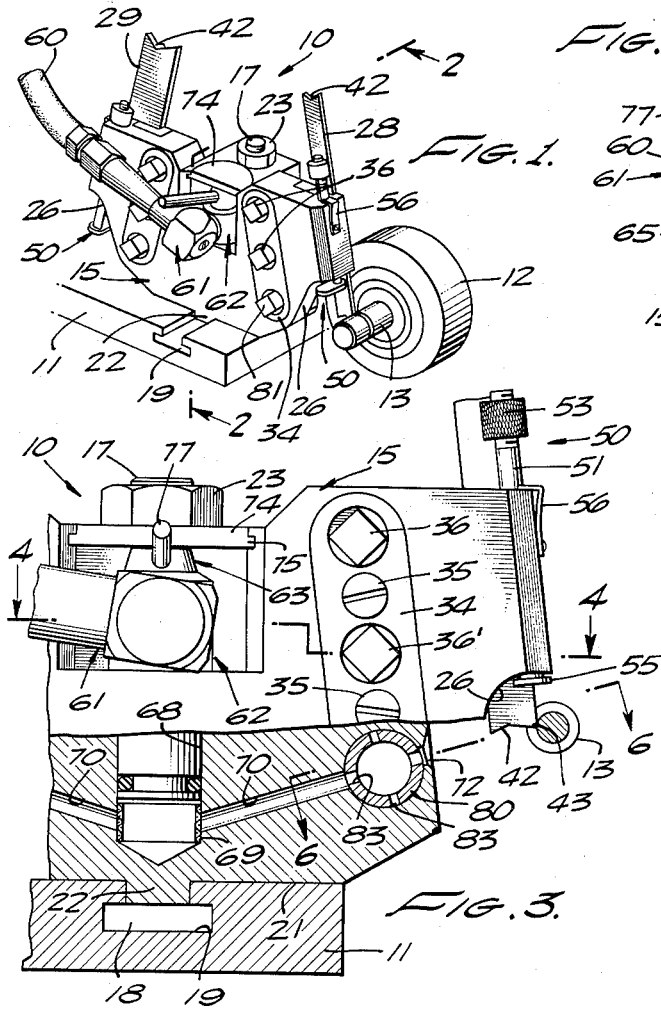
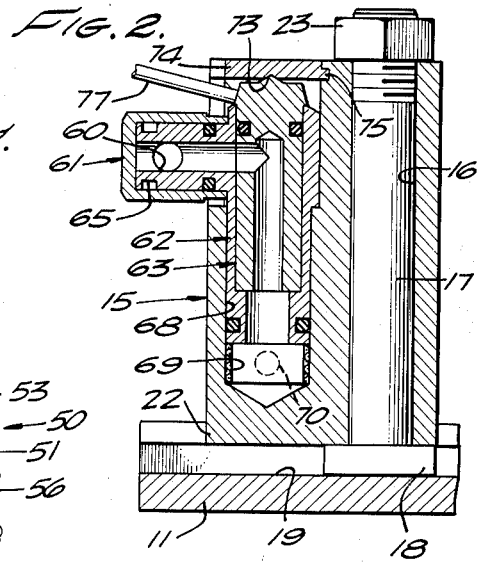
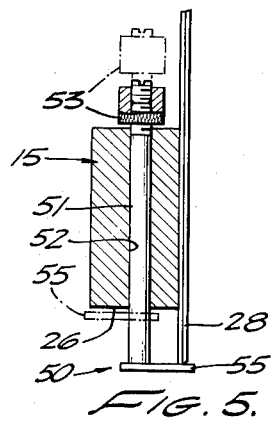
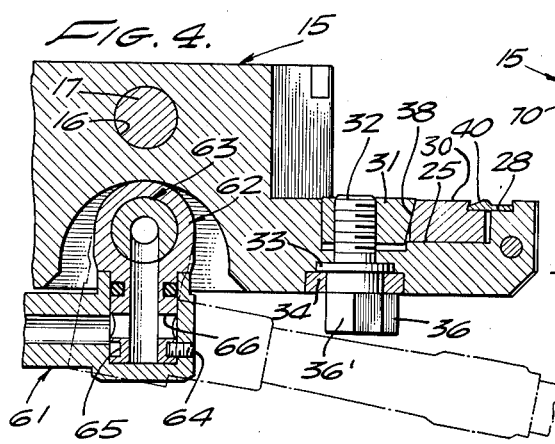
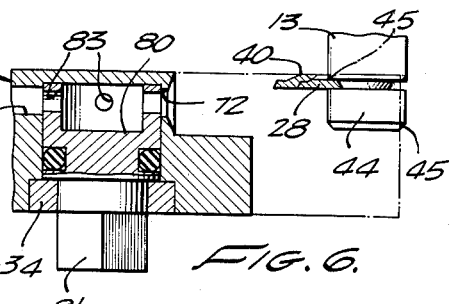
INVENTOR.
GEORGE B. JOHNSON
BY
ATTORNEY United States Patent Office 3,234,828
Patented Feb. 15, 1966

3,234,828
CUT-OFF TOOL AND HOLDER ASSEMBLY
George B. Johnson, 2800 Newell St., Los Angeles, Calif.
Continuation of application Ser. No. 213,283, July 30, 1963. This application Sept. 21, 1964, Ser. No. 405,322
16 Claims. (Cl. 82—36)

The holder of this invention is particularly suitable for clamping a combination type cut-off tool of the design disclosed and claimed per se in my United States Letters Patent 2,979,805, granted April 18, 1961, entitled Cut-Off Tool. This application is a continuation of my application for United States Letters Patent Serial No. 213,283, filed July 30, 1963, for Cut-Off Tool and Holder Assembly, and now abandoned.

This invention relates to tool holders and more particularly to an improved tool blade and holder assembly designed for rigidly supporting a plurality of combination cut-off tools selectively mountable on either the forward or the rear cross-slide carriage of a machine tool to cut off finished material from a workpiece chucked in the machine tool.

The cut-off tool holder or mounting proper for my combination cut-off tool blade has a tool blade seating groove and clamping facility extending along either end at an acute angle to the vertical. Only a relatively short portion of the blade projects below the lower end of the seating groove and, when used on horizontally fed carriages, it is important that its foremost corner be adjusted to lie generally in a horizontal plane coincident with the axis of the workpiece to be parted. The adjustment of the tool blade in this groove and the replacement of one blade with another of different size is frequently necessary for various reasons well known to persons skilled in this art. It is found that valuable time is lost in accurately adjusting the tool blade to its proper operating position and it is one of the principal purposes of the present invention to provide the tool holder with a retractable setting gage which is instantly available for use in setting the tool blade at any time and is thereafter retractable to an area offering no interference with the normal use of the holder assembly.

Another object of the invention is the provision of improved coolant supply and control means which may remain connected with the assembly and functions with equal convenience irrespective of whether the holder assembly is mounted on the front or on the rear cross slide. Another feature of the coolant supply is a readily disassemblable mounting therefor having a swiveling seat in the main body of the holder and incorporating a simple, readily disassemblable regulating and cut-off valve for the coolant. The supply connections for the coolant require no fasteners of any kind nor any tools required for the assembly or disassembly of the simple fittings to the holder body proper. The fittings are of exceptionally rugged and simple design embodying a minimum number of components having simple seal devices providing fluid-tight connections between the main body and the fittings when in assembled position.

Accordingly, it is a primary object of the present invention to provide a simple, rugged mounting assembly for a pair of combination cut-off tool blades designed for selective mounting on either the front or the rear cross slide of a machine tool and incorporating novel features not previously available.

Another object of the invention is the provision of a cut-off tool mounting assembly incorporating a retractable setting gage for the tool blades.

Another object of the invention is the provision of a readily demountable cut-off tool and mounting assembly featuring coolant supply and control means and functioning with equal convenience to the operator irrespective of the cross slide on which mounted.

Another object of the invention is the provision of a holder assembly for a cut-off tool featuring readily detachable coolant supply fittings having swiveling components arranged to swivel in planes at right angles to one another and readily disconnectable from the body of the holder assembly without need for tools or fasteners.

These and other more specific objects will appear upon reading the following specification and claims and upon considering in connection therewith the attached drawings to which they relate.

Referring now to the drawings in which a preferred embodiment of the invention is illustrated.

FIGURE 1 is a generally perspective view illustrating a preferred embodiment of the cut-off blade and holder assembly shown supported on the front cross slide of a machine tool and in use to part a workpiece mounted in the chucking assembly of the tool;

FIGURE 2 is an enlarged cross-sectional view taken along line 2—2 on FIGURE 1;

FIGURE 3 is a fragmentary side elevational view partly in section and showing the holder assembly in its operating position;

FIGURE 4 is a fragmentary sectional view taken along broken line 4—4 on FIGURE 3;

FIGURE 5 is a fragmentary sectional view taken longitudinally of the stem of the tool setting gage; and FIGURE 6 is a fragmentary sectional view taken along the broken line 6—6 on FIGURE 3.

Referring more particularly to FIGURE 1, there is shown a preferred embodiment of a cut-off tool blade holder assembly designated generally 10 and selectively securable to either the forward or rear cross slide of a machine tool. For purposes of illustration only, a portion of one cross slide carriage 11 has been indicated in its usual operating relationship to the machine tool chucking assembly 12 supporting a workpiece 13 therein. As is well known to those familiar with machine tools, the forward and front cross slides are generally similar to one another and disposed forwardly and rearwardly of the chuck axis and include suitable means for advancing each carriage 11 along with the tool holder mounted thereon laterally toward the workpiece, and usually in a common horizontal plane.

The tool holder proper has an elongated one-piece main body 15 having a thickened central portion formed with a vertical bore 16 (FIGURES 2, 4) for receiving a mounting T-bolt 17 having its head 18 freely slidable along the T-slot 19 extending crosswise of the inner end of cross slide carriage 11. The accurately finished base 21 of main body 15 is provided with an integral rib 22 shaped to seat snugly within the stem portion of T-slot 19 to assure the accurate positioning of the tool holder relative to the workpiece, particularly when nut 23 at the upper end of the T-bolt is firmly tightened.

The opposite ends of the elongated vertically supported main body 15 are provided with relatively wide shallow grooves (FIGURE 4) 25 having the stepped bottom configuration illustrated in FIGURE 4 and each extending at an acute angle to the vertical. Each of the grooves opens at its lower end into the deeply relieved lower corner 26 of the main body, the cut-away corner permitting the main body to be advanced into the zone occupied by workpiece 13 when presenting the forward cutting corner of the tool blade to the workpiece. As herein shown, tool mounting grooves 25 are designed to support combination double-edged cut-off blades 28, 29 the details of which are described in the above mentioned patent, each blade being individual rigidly clamped in place by a clamping member 30 and a pair of cooperating actuator members 31 therefore corresponding in design and function to clamping member 20 and actuator 25 of my copending application for patent, Serial No. 398,148, filed Sept. 14, 1964.

Actuator members 31 are threaded to mate with the threaded shank of an associated clamping screw 32. Clamping screws 32 are each provided with a collar 33 adapted to seat in a well of the main body and are secured loosely in place therein by a keeper plate 34 held assembled to the main body by cap screws 35. The non-circular heads 36, 36′ of screws 32 project beyond the surface of the main body to receive a suitable operating tool. Desirably, keeper plates 34 are seated in a complementally shaped recess formed in the face of the main body to the end that the keeper may lie flush with the base of the main body. The relatively small actuator members 31 seat within notches formed in the inner edge of clamping member 30 and the bottom of this notch and the adjacent surface of actuator 31 have complemental inclined surfaces 38 lying at an angle to the clamping screws 32 with the result that rotation of the clamping screws in one direction is effective to shift the clamping member 30 against the edge of cut-off tool 28. Likewise, rotation of the clamping screws in the opposite direction acts to shift actuating members 31 away from the clamping member allowing the latter to shift to the left, as seen in FIGURE 4, and away from the inner edge of the cutting tool. The clamping screws themselves do not shift axially due to the cooperating action of their collars 33 with respect to the inner surface of keeper plates 34.

As is made clear by FIGURE 4, the inner surface of cut-off blade 28 seats against the bottom of the groove provided in part by the main body of the holder and in part by the notch extending lengthwise along the corner of clamping member 30. It will be understood that the side walls of the tool seating groove are preferably crowned toward one another lengthwise of the groove and, in addition, the side walls are inclined to converge toward one another as they approach the face of the tool body. The inclination of the side walls corresponds generally to the slope with which edges of the cut-off blades are finished. The crowned side walls will therefore be understood as engaging against these sloping edges in an elongated area spaced inwardly from the tool faces with the result that the powerful clamping action provided in the manner just described cannot injure or deform the important longitudinal cutting corners of the blades.

The outer face of the blade is provided with a reinforcing rib 40 extending lengthwise thereof and having its opposite side edges suitably shaped to chamfer the rim edges of the workpiece during the final stage of the cut-off operation. Desirably, rib 40 is offset slightly to one side of the longitudinal axis of the blade to the end that the opposite lateral edges of the rib may be selectively used to chamfer workpieces of corresponding different diameters, all as explained in detail in the aforementioned patent. In this connection, it is pointed out that the width of the blade between a lateral face of the rib and the adjacent edge of the blade corresponds to the radius of the workpiece for which that half of the blade is designed.

The opposite ends of the cut-off blades are provided with shallow V-notches 42. The lower foremost corner 43 of the blade and of the associated leg of notch 42 constitutes the cutting edge advanced into the workpiece 13 to part the end portion 44 therefrom. As corner 43 approaches the axis of the workpiece to complete the cut-off operation, the adjacent side of rib 40 engages the rim edge of workpiece 13 to chamfer this corner, as is indicated at 45 in FIGURE 6. Accordingly, relief of the corner and the cut off of the workpiece are accomplished simultaneously by the same tool.

To be observed from FIGURE 3 is the fact that the sides of V-notch 42 are disposed to provide a suitable chip rake with respect to the associated cutting corner, as corner 43. Thus, the side of V-notch 42 adjacent tool corner 43 actually engaged in a cutting operation lies slightly above a horizontal plane passing through the workpiece and the angle of this side of the notch with respect to this horizontal plane represents the chip rake angle. Likewise, the longitudinal edge of the tool blade in contact with the workpiece is inclined to the vertical and the angle of this inclination represents the feed rake angle, commonly known merely as feed rake. The workpiece is, of course, rotated clockwise when the parts are disposed as shown in FIGURE 3 and the principal forces acting on the very short exposed lower end of the tool blade are transmitted in part crosswise of the width of the blade and partly upwardly along the blade into the main body of the holder.

To expedite and facilitate accurate adjustment of the tool blade within its mounting groove, there is desirably associated with each groove a setting gage designated generally 50. This gage comprises a shank or stem 51 (FIGURE 5) slidably supported in a bore 52 extending across either end of the main body with its axis generally parallel to the axis of the tool blade. The threaded upper end of shank 51 is provided with a snug fitting thumb nut 53 which is present in the position required to accommodate a given tool mounting assembly to a particular machine tool. The lower end of shank 51 is provided with a gaging extension 55 having its upper surface lying accurately normal to the axis of the shank. Normally, tool gaging device 50 is held retracted by the engagement of a spring keeper 56 mounted on the holder body and having its end snugly and frictionally engaging the exposed upper end of the gage shank 51 in the manner illustrated in FIGURES 1 and 3. At this time, gaging extension 55 is rotated away from the tool to lie in the position shown in FIGURE 1 closely adjacent the upper portion of cut-away corner 26.

When in use to accurately position the lower cutting corner 43 of a tool 28, gage 50 is depressed until thumb nut 53 is firmly seated against the top edge of holder body 15, the gage being rotated so that gaging member 55 extends into the path of a tool seated in groove 25, all as is shown in FIGURE 5. It will be understood that nut 53 has been preadjusted so that when the gage is extended, in the manner just described, the upper surface of member 55 will lie accurately on a horizontal plane passing through the axis of the workpiece. Having placed the gage in this position, the workman then inserts the tool blade in seating groove 25 allowing its forward lower corner to lightly engage or rest against the upper surface of gage member 55. While so supported, the workman tightens the actuator screws 32, 32 to clamp the blade rigidly in its proper cutting position. This operation having been completed, gage 50 is then rotated 180 degrees and elevated to its retracted position where it is firmly held by spring keeper 56.

Should tool holder assembly 10 be transferred to a different machine tool having the axis of its workpiece chuck located at a different height above the flat bottom 21 of holder 15 when clamped to the cross slide of that machine, then it is merely necessary to adjust thumb nut 53 of gage 50 to accommodate the gage extension 55 to the different relationships characteristic of the new machine tool. However, once the gage is properly set for any particular machine tool, the holder assembly may be repeatedly removed and remounted on either the forward or the rear cross slide carriage of that machine without need for readjusting or resetting gage 50.

The means for supplying coolant fluid selectively in any desired quantity and directed onto the workpiece as desired will now be described. Desirably, the coolant supply means should remain connected to the tool holder assembly during the transfer of the latter between the two cross slide carriages and should also be readily adjustable to extend away from the cutting zone while in either operating position. To meet these desirable requirements, the coolant supply facilities of the present invention include a flexible supply hose connected to the holder proper through a fitting assembly capable of swiveling through both a vertical and a horizontal plane and, in addition, these fittings are quickly detachable as a unit from the holder without need for tools. These and other objectives are achieved in the present assembly, as will now be described in detail.

The coolant supply asesmbly comprises two tubular L-shaped fittings 61, 62 and a valve member 63 and any suitable means such as retainer 74 for holding the assembly detachable to body 15. The shorter arm of member 61 is telescoped over the shorter arm of fitting 62 and has swiveling movement there about while being held in assembled relation by a set screw 64 (FIGURE 4), the inner end of which seats in an annular groove 65 encircling member 62. Communication between the hollow passages of members 61 and 62 is provided only by way of a transverse passage 66 extending crosswise of the horizontal leg of member 62 and opening into the passage extending along the longer leg of fitting 61. Accordingly, flow between these fittings occurs only when the longer leg of member 61 is in a generally horizontal position and extending generally laterally away from workpiece 13.

The longer or vertical leg of member 62 has a close running fit within a cylindrical well 68 formed in holder 15 and opening upwardly through its top edge. The open lower end of fitting 62 discharges into the center of a sleeve-like filter screen 69 and thence through passages 70 (FIGURE 3) opening through the end wall of the cut-away corners 26 at the opposite ends of the holder. Valve 63 is seated in the open upper end of fitting 62 and has a conical projection 73 in its top end seating in a similarly shaped depression in the underside of a retainer or cover plate 74. This cover is semicircular in shape and has a peripheral flange 75 having a mating engagement with a groove formed in holder body 15. The parts of the coolant supply assembly are so dimensioned that retainer cover 74 can be slid into assembled relation over the conical extension 73 and retained there to hold the parts assembled. This is particularly true when the coolant supply is turned on at which time the pressure of the coolant acts to lift valve 63 slightly thereby holding extension 73 seated in the depression formed in retainer 74.

The L-shaped passage through the valve member has its shorter leg positioned to register with the horizontal leg of fitting 62 when the operating handle 77 of the valve is positioned as shown in FIGURE 3. When the valve is rotated either to the left or to the right from this fully open position, the flow of coolant is throttled or completely cut off depending upon the adjusted position of handle 77.

From the foregoing it will be apparent that the coolant supply fittings can be readily disassembled without need for tools, it merely being necessary to depress the fittings slightly while sliding retainer 74 out of its supporting groove. The entire fitting assembly is then withdrawn vertically from well 68. If desired, valve member 63 may be withdrawn from fitting 62 for inspection, cleaning or the replacement of the O-ring seal encircling its upper end. Otherwise, the three parts remain assembled as respects one another and can be inserted in a different blade holder when the machine tool operator is ready to proceed with other machining operations. If the operator merely wishes to detach hose 60 from the fitting assembly, he loosens set screw 64 and withdraws fitting 61 from the horizontal leg of fitting 62.

There remains to be described the adjustable coolant director illustrated in FIGURES 3 and 6. This director includes a hollow shank 80 seating in a cylindrical well opening through the side wall of holder 15 closely adjacent the lower corner thereof. The shouldered shank 80 is held in assembled position by the same keeper plate 34 used to hold the clamping screws 32 in assembled position. Its outer end 81 is noncircular for convenience in rotating the shank 80 to any desired adjusted position. This shank is provided with pairs of different diameter aligned ports 83 which can be brought into alignment with the supply passage 70 and with jetting port 72. Note that the diameter of port 72 is appreciably larger than ports 83 with the result that the direction of the coolant jet issuing from the adjacent one of ports 83 can be directed to discharge upwardly or downwardly through an appreciable range of angles with respect to the workpiece. Also, shank 80 is rotatable to disalign ports 83 with passage 70 to cut off flow to one end of the holder assembly while the other end is being used for a cut-off operation.

Of importance is the fact that the dual horizontal and vertical axis swivelling characteristics of fittings 61, 62 permit supply hose 60 to lie in a generally horizontal direction extending away from the workpiece irrespective of whether holder 15 is mounted on the front or rear cross slide 11. Also this double swiveling movement permits the longer leg of fitting 61 to be swung 180 degrees despite the fact that operating handle 77 of valve 63 lies in the general path of swiveling movement. This will be best understood by reference to FIGURE 4 indicating that the longer leg of fitting 61 can be swiveled about a vertical axis while itself being pivoted about the axis of its shorter leg. It will likewise be understood that operating valve handle 77 can be rotated through a wide arc and as necessary to permit bypassing thereof by fitting 61.

While the particular cut-off tool and holder assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A cut-off tool and mounting assembly adapted to be detachably clamped as a unit to the cross slide of a machine tool, said assembly comprising, a main body having a transverse rib across the lower edge thereof sized to fit snugly in the inlet of a T-slot of a machine tool cross slide, means carried by said main body mounted in a vertical opening through said rib and operable to clamp said main body rigidly to a support therefor, a wide shallow groove opening through one side face of said main body closely adjacent one end thereof and extending at an acute angle to the vertical, a thin wide double-edged cut-off blade mounted in said groove, clamping means for rigidly anchoring said blade in said groove by compressive pressure acting transversely of the width thereof and applied to the opposite lateral edges of said blade, said blade having shallow V-notches formed in its opposite ends, the lower foremost corner of said blade lying substantially on a horizontal plane coincident with the axis of a workpiece when properly adjusted to sever the latter, a retractable setting gage for said tool blade, said gage having a stem reciprocably supported along the end of said main body closely adjacent said tool mounting groove and having an extension projecting from the lower end thereof having an upper surface normal to the axis of said tool blade, said extension being movable across the lower end of the tool blade to engage the lower foremost corner thereof, and adjustable stop means for presetting said gage, whereby said gage may be positioned with its upwardly facing surface lying in a generally horizontal plane containing the axis of the workpiece and used to expedite accurate positioning of said tool blade when servicing, adjusting and replacing the same.

2. The assembly defined in claim 1 characterized by the provision of means for normally holding said gage in adjusted position whereby the gage may be retracted with the extension on the lower end thereof removed from risk of contact with the workpiece.

3. The assembly defined in claim 1 characterized in that said main body is provided with generally similar blade mounting grooves, cut-off tool blades and associated independently operating tool setting gages at either end of said main body whereby each blade may be selectively used for cut-off operations depending on whether said assembly is mounted on the conventional front or rear cross slide of a machine tool.

4. A cut-off tool blade mounting assembly having duplicate cut-off blade clamping facilities mounted lengthwise along and closely adjacent the opposite end edges thereof either of which can be placed in effective operating position depending on whether said assembly is mounted in the front or the rear cross slide of conventional types of machine tools, said blade mounting assembly having a main body provided with a coolant fluid control and supply assembly detachably mounted thereon, said fluid supply assembly being adapted to remain connected to a flexible coolant supply hose and including a hollow L-shaped fitting having one leg lying normal to the side of said main body and a second leg lying along the side of said main body and pivotable in an arc about the axis of said one leg to facilitate positioning of said second leg to extend away from the workpiece to be cut off irrespective of which cross slide said assembly is mounted on, and separate combined flow cut-off valve and coolant jet adjusting means connected to said coolant supply assembly and associated with a respective one of said cut-off tool blade clamping facilities.

5. A tool blade mounting assembly as defined in claim 4 characterized in that said coolant supply assembly includes means holding the same in assembled position and a hollow tubular support member having a close sliding fit within a well opening downwardly into said main body generally centrally thereof, said tubular support having a tubular extension projecting horizontally from the upper end thereof rotatably seating said one leg of said L-shaped coolant supply fitting, said L-shaped fitting being rotatable about the axis of said tubular extension and said tubular support being rotatable with respect to the axis of said well.

6. A tool blade mounting assembly as defined in claim 5 characterized in that the upper end of said tubular support is normally closed by an inverted cup-shaped valve member having an inlet opening in its side wall positioned in the plane of the inner end of said tubular extension, said valve member being rotatable to adjust the registry of the inlet opening thereof with respect to the adjacent end of said tubular extension to regulate the flow of coolant fluid and to cut off coolant flow.

7. A tool blade mounting assembly as defined in claim 6 characterized in that the two relatively rotatable components of said coolant supply and control assembly are removable as a unit from said main body by lifting the same axially through the top of said well.

8. A tool blade mounting assembly as defined in claim 6 characterized in that said coolant supply and control assembly holding means includes a cover plate and retainer overlying the top thereof and slidably supported in mounting groove means therefor formed in said main body, the upper end of said coolant supply and control assembly and the underside of said retainer being interengageable to prevent withdrawal of said retainer until a withdrawal force is deliberately applied to said retainer.

9. A cut-off tool blade mounting assembly selectively securable to the conventional front and rear cross slide carriages of a machine tool, said assembly having a main body provided with means for detachably clamping the same to either of said cross slide carriages, a pair of relatively wide shallow tool blade mounting grooves opening through the same face of said main body with the width of said grooves adapted to lie in a plane normal to the axis of the workpiece, said grooves converging upwardly toward one another at an acute angle to the vertical, means associated with each of said grooves for clamping a combination cut-off and chamfering blade therein having a V-shaped notch in its lower end each lateral corner of which is adapted to be positioned to cut off the end of a workpiece, coolant supply means including means for holding the same detachably and rotatably mounted on said main body between said tool blade mounting grooves, said coolant supply means being readily withdrawn from said main body without need for tools, and means for jetting coolant from said supply means onto the lower forward cutting edge of the particular cut-off tool selected for use in a given cut-off operation.

10. A cut-off tool blade mounting assembly as defined in claim 9 characterized in that said coolant supply means includes means for regulating the quantity and the direction of travel of the jet of coolant flowing onto the area of the workpiece undergoing cutting.

11. A coolant fluid supply and flow control assembly attachable to the discharge end of a flexible coolant supply hose, said assembly comprising a pair of L-shaped fittings having open ended passages through each one thereof, a leg of one fitting being telescoped over and having a swiveling connection about a leg of the other fitting, a transverse passage through the enclosed leg of the said other fitting having its ends disposed to communicate with the passage along a leg of said one fitting when rotated to overlap with the end of said transverse passage, the inlet end of said one fitting being connectible with a flexible coolant supply hose, means holding said other fitting in assembled position, and the outlet end of said other fitting being cylindrical and adapted for insertion and withdrawal from a snug fitting seating well therefor formed in the body of a mounting assembly for a machine tool cutting blade, said cylindrical outlet end supporting an O-ring sealing gasket and being readily withdrawable therefrom to permit said coolant supply assembly to be assembled to and withdrawn from a variety of tool blade holder assemblies and to being shiftable bodily about the axis of the well in said assemblies.

12. A coolant supply and control assembly as defined in claim 11 characterized in that said other fitting includes a flow regulating valve rotatably seated in a well opening through the junction of its two legs and having a passage therein with its opposite ends in communication with a respective one of the legs of said other fitting, said valve being rotatable to regulate flow of coolant to the discharge end of said other fitting.

13. The assembly defined in claim 1 characterized in that said main body is provided with coolant fluid passage means formed therein, said coolant passage means including outlet port means adjustably supported in said main body and substantially concealed from view except for a manually engageable control member protruding from an exterior surface of said main body, said outlet port means being adjustable to vary the size and direction of flow of a coolant fluid therefrom and onto a workpiece while in the process of being cut off by one end corner of said cut-off blade.

14. The assembly defined in claim 13 characterized in that said main body has a notched lower corner facing outwardly and downwardly from adjacent portions of said main body, said wide shallow groove for said cut-off blade opening downwardly through the upper edge of said notch, and said coolant outlet port means opening outwardly from the generally vertically disposed edge of said notch so as to discharge coolant onto the lower end of a cut-off blade mounted in said wide shallow groove with its lower end projecting into said notch.

15. The assembly defined in claim 13 characterized in the provision of releasable means normally holding said setting gage in adjusted position whereby said gage may be retracted closely against said main body and out of the path of coolant issuing from said coolant outlet port means.

16. A cut-off tool blade mounting assembly as defined in claim 9 characterized in the provision of retractable setting gage means for said cut-off blade adjustably supported on said main body, and means for holding said gage in any selected position, said setting gage means being normally retracted from its blade setting position to a position closely against a surface of said main body and out of the path of coolant flowing from said coolant supply means when the cut-off blade is in use, and said coolant supply means being so positioned on said main body as not to interfere with the extension and use of said blade setting gage means.

References Cited by the Examiner

UNITED STATES PATENTS

| | | | |
|---|---|---|---|
| 961,281 | 6/1910 | Andrew | 82—34 |
| 1,394,628 | 10/1921 | Kramer et al. | 82—36 X |
| 2,335,570 | 11/1943 | Montgomery | 29—95 |
| 2,550,645 | 4/1951 | Retz | 29—106 |
| 2,679,679 | 6/1954 | Metzler | 29—95 |
| 2,716,914 | 9/1955 | Pigott | 82—34 |
| 2,716,915 | 9/1955 | Biber | 82—34 |
| 2,979,805 | 4/1961 | Johnson | 29—95 |

FOREIGN PATENTS

| | | |
|---|---|---|
| 1,019,902 | 11/1952 | France. |
| 548,299 | 9/1956 | Italy. |

WILLIAM W. DYER, JR., *Primary Examiner.*

L. VLACHOS, *Assistant Examiner.*